(12) United States Patent
Hepburn et al.

(10) Patent No.: US 6,813,882 B2
(45) Date of Patent: Nov. 9, 2004

(54) SYSTEM AND METHOD FOR REMOVING NOX FROM AN EMISSION CONTROL DEVICE

(75) Inventors: Jeffrey Scott Hepburn, Birmingham, MI (US); Robert Henry Hammerle, Franklin, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 10/213,503

(22) Filed: Aug. 7, 2002

(65) Prior Publication Data

US 2002/0178716 A1 Dec. 5, 2002

Related U.S. Application Data

(62) Division of application No. 10/025,723, filed on Dec. 18, 2001.

(51) Int. Cl.[7] .................................................. F01N 3/00
(52) U.S. Cl. ........................... 60/286; 60/295; 60/297; 60/303; 60/324
(58) Field of Search ........................ 60/274, 286, 292, 60/295, 297, 301, 303, 324

(56) References Cited

U.S. PATENT DOCUMENTS

| 4,276,071 A | 6/1981 | Outland |
| 4,857,028 A | 8/1989 | Pail |
| 4,857,089 A | 8/1989 | Kitagawa et al. |
| 5,193,340 A | 3/1993 | Kamihara |
| 5,388,406 A | 2/1995 | Takeshima et al. |
| 5,406,790 A | 4/1995 | Hirota et al. |
| 5,492,679 A | 2/1996 | Ament et al. |
| 5,519,993 A | 5/1996 | Rao et al. |
| 5,586,433 A | * 12/1996 | Boegner et al. .............. 60/274 |
| 5,711,149 A | 1/1998 | Araki |
| 5,746,989 A | * 5/1998 | Murachi et al. ......... 423/213.7 |
| 5,884,476 A | * 3/1999 | Hirota et al. ................. 60/278 |
| 5,974,791 A | * 11/1999 | Hirota et al. ................. 60/276 |
| 6,176,078 B1 | * 1/2001 | Balko et al. .................. 60/274 |
| 6,446,430 B1 | * 9/2002 | Roth et al. .................... 60/286 |

FOREIGN PATENT DOCUMENTS

| EP | 0560991 A1 | 9/1993 |
| JP | 06-272541 | 3/1993 |
| JP | 07-259541 | 3/1994 |

* cited by examiner

*Primary Examiner*—Binh Q. Tran
(74) *Attorney, Agent, or Firm*—Allan J. Lippa

(57) ABSTRACT

A system and method for removing NOx from an emission control device is provided. The emission control device is coupled adjacent and downstream of an oxidation catalyst. The method includes adding a reductant to the exhaust gases flowing into the oxidation catalyst. The method further includes partially oxidizing the reductant in the oxidation catalyst to transition a remaining portion of the reductant into a vapor phase. Finally, the method includes oxidizing the remaining portion of the reductant in the emission control device to remove NOx from the device.

16 Claims, 8 Drawing Sheets

SYSTEM AND METHOD FOR REMOVING NOX FROM AN EMISSION CONTROL DEVICE

This is a Divisional of U.S. Ser. No. 10/025,723, flied Dec. 18, 2001.

FIELD OF THE INVENTION

The present invention relates to a system and method for removing NOx from an emission control device coupled to an engine.

Description of the Related Art

It is known to utilize a NOx trap to reduce NOx emissions from an engine. One such engine and NOx trap is disclosed in Japanese Patent 06-272541A. In particular, an engine control system injects a reductant in the exhaust gases upstream of the NOx trap to reduce NOx stored in the trap.

The known engine control strategy, however has a significant drawback. The injected liquid reductant is composed of a plurality of droplets and therefore the reductant is not well mixed with the exhaust gases, as compared to having a vaporized reductant which would be well mixed with the exhaust gases. As a result, the reductant is unevenly distributed within an emission control device such as a NOx trap. For example, a reductant droplet contacting a particular area within the NOx trap will reduce stored NOx at that area. However, relatively large areas of the NOx trap, not contacted by the droplets, will not have stored NOx removed.

The inventors herein have recognized that a system and method are needed for vaporizing a reductant prior to supplying the reductant to an emission control device such as a NOx trap for optimal NOx reduction.

SUMMARY OF THE INVENTION

The foregoing problems and disadvantages are overcome by a system and method for removing NOx from an emission control device in accordance with the present invention.

The inventive method is implemented in an engine having an emission control device coupled adjacent and downstream of an oxidation catalyst. The method includes adding a reductant to the exhaust gases flowing into the oxidation catalyst. The method further includes partially oxidizing the reductant in the oxidation catalyst to transition a remaining portion of the reductant into a vapor phase. The method further includes oxidizing the remaining portion of the reductant in the emission control device to remove NOx from the device.

A system for removing NOx from an emission control device is also provided. The system includes an oxidation catalyst receiving exhaust gases from an engine. The oxidation catalyst is coupled adjacent and upstream of the emission control device. The system further includes a valve selectively supplying reductant to the exhaust gases flowing into the oxidation catalyst responsive to a first signal. The system further includes a controller operably connected to the valve. The controller generates the first signal to add the reductant to the exhaust gases flowing into the oxidation catalyst. The oxidizing catalyst partially oxidizes the reductant to obtain a remaining portion of the reductant in a vapor phase. The device oxidizes the remaining portion of the reductant to remove NOx from the device.

The inventive system and method provides a substantial advantage over known systems and methods. In particular, the inventive system and method vaporizes a reductant prior to supplying the reductant to an emission control device to increase NOx reduction by the device as compared with known systems.

Description of an Embodiment

Figure 1:
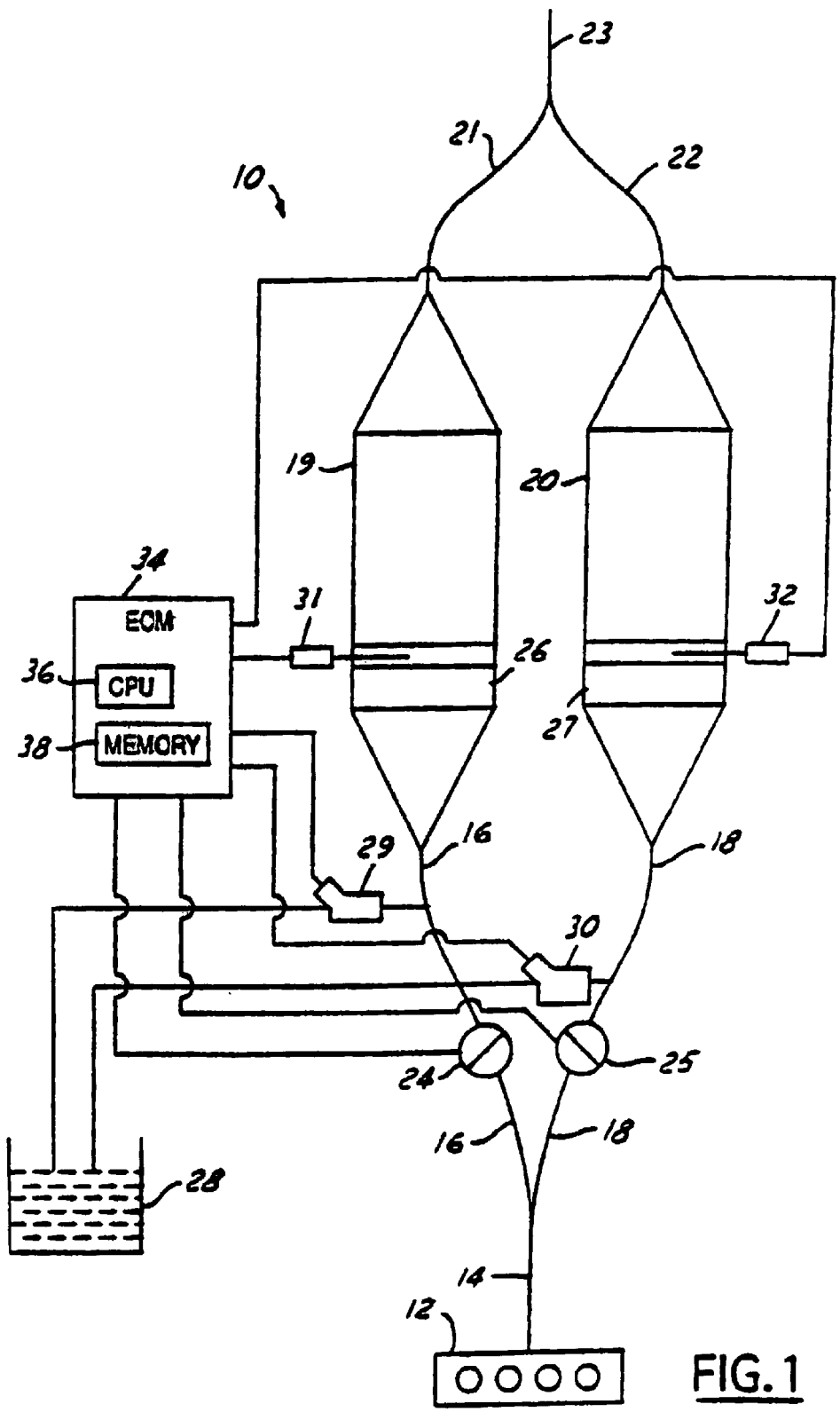
FIG. 1 is a plan view of an exhaust system coupled to an engine.

Referring now to FIG. 1, an exhaust system 10 is illustrated in operational relationship with an internal combustion engine 12 such as a diesel engine for a vehicle such as an automotive vehicle (not shown). The engine 12 has an exhaust manifold 14 to direct the exhaust gases from engine 12 to exhaust system 10. The exhaust manifold 14 is divided into two exhaust intake conduits 16, 18. The exhaust intake conduits 16, 18 direct exhaust gases through two integrated $NO_x$ trap/particulate filters 19, 20. The outputs of the filters 19, 20 are directed through two exhaust output conduits 21, 22 to a muffler or tail pipe 23. The amount of exhaust gases flowing to filters 19, 20 is controlled by control valves 24, 25, respectively. Conventional oxidation catalysts 26, 27 are located upstream and proximate filters 19, 20, respectively.

The oxidation catalysts 26, 27 serve several functions. First, catalysts 26, 27 are utilized to accurately control temperatures in filters 19, 20, respectively. Fuel injected into the exhaust gases upstream of catalysts 26, 27 can be used to create exothermic reactions in catalysts 26, 27 to provide exhaust gases at desired temperatures to filters 19, 20, respectively. Thus, temperature spikes produced by the injected fuel only occur within catalysts 26, 27 instead of filters 19, 20—thereby protecting filters 19, 20 from degrading due to excess temperatures. Further, controlled exothermic reactions in catalysts 26, 27 allow filters 19, 20 to be maintained within desired temperature ranges and air-fuel ranges for optimally removing NOx, $SO_x$, and particulate matter. It should be understood, however, that an oxidation catalyst as taught by this specification can be used to control a temperature of any proximate downstream emission control device such as a NOx absorber, a catalytic converter, and a particulate filter, for example. Second, catalysts 26, 27 begin burning the fuel injected into the exhaust gases and rapidly vaporize the remaining fuel before the mixture of fuel and exhaust gases reach filters 19, 20, respectively. The vaporized fuel more effectively reduces NOx within filters 19, 20 as compared to injecting liquid fuel directly into filters 19, 20.

A reducing agent supply tank 28 and associated fuel nozzles 29, 30 enable precise quantities of reductant, such as diesel fuel, to be injected into the exhaust path intake conduits 16, 18. In the case of a diesel engine, the reductant is preferably the diesel fuel supply in the vehicle fuel tank. It should be understood, however, that other reductants such as gasoline for example could be used as the injected reductant.

In addition, temperature sensors 31, 32 generate feedback signals to the engine control module (ECM) 34. The signals are indicative of temperatures of exhaust gases exiting catalysts 26, 27, respectively—obtained from exothermic reactions in oxidation catalysts 26, 27. The ECM 34, in turn, controls the flow of exhaust gases through exhaust system 10 as well as the regeneration process of filters 19, 20. Logic control of system 10 is carried out in ECM 34 by way of a central processing unit (CPU) 36 such as a microprocessor 36 and an associated memory 38.

Figure 2:
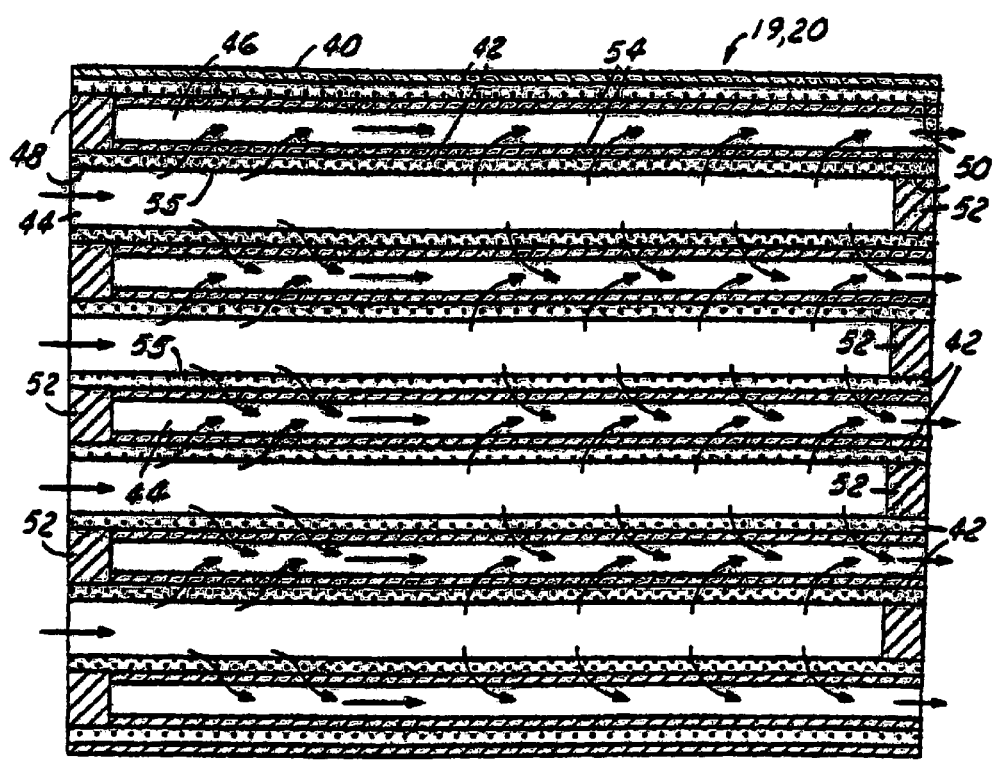
FIG. 2 is a schematic diagram of a dual NOx trap and particulate filter of the exhaust system of FIG. 1.

Referring to FIGS. 1 and 2, each of the exhaust filters 19, 20 may include a filter substrate 40 extending along a longitudinal axis. The filter substrate 40 has a plurality of walls 42 extending longitudinally and forming a plurality of alternating first and second channels 44 and 46. The walls 42 may be made of a ceramic material such as ceramic cordierire. The ceramic material is porous and has a pore size of approximately 60 microns. The walls 42 have a thickness of 10 to 20 mils. The walls 42 are configured to provide 50 to 200 channels per square inch. Channels 44, 46 have a generally rectangular cross-section, although it should be appreciated that the cross-sectional area of the channels 44,46 is dictated by flow and filtering requirements.

Each of channels 44, 46 have an inlet end 48 and an outlet end 50. The first channels 44 have a blocking member 52 to close the outlet end 50 and the second channels 46 have a blocking member 52 to close inlet end 48. The blocking member 52 is made of ceramic material such as ceramic cordierite. Second channels 46 also have a $NO_x$ absorbent wash coat 54 extending from the outlet end 50 along the walls 42 toward the inlet end 48. The wash coat 54 is a $NO_x$ absorbent applied by conventional procedures. The $NO_x$ absorbent may be (i) a precious metal such as Pt-Rh and an alkali metal such as potassium or lithium, or (ii) alkaline earth metals such as barium or strontium or (iii) lanthanides such as cerium—dispersed into an alumina support deposited onto walls 42 of second channels 46.

It should be appreciated that alternate channels 44, 46 are blocked to force all of the exhaust gas flow through walls 42 having wash coat 54 thereby filtering the exhaust gas particulate matter and absorbing the $NO_x$. Exhaust gases from engine 12 enter through the inlet openings 48, pass through porous walls 42 of the substrate 40, and exit through the second channels 46 at open outlets 50. Since the particulate matter is too large to pass through the pores within substrate wall 42, it deposits onto surface 55 of the open channels 44. The $NO_x$, HC, and Co pass readily through the substrate wall 42. $NO_x$ is stored as a nitrate complex while HC and CO are oxidized over the platinum within $NO_x$ trap wash coat 54.

Referring to FIGS. 1 and 2, under the control of ECM 34, all of the exhaust gases flowing from engine 12 may be directed, for example, to first exhaust intake conduit 16 and corresponding catalyst 26 and filter 19 by controlling valves 24, 25. In this example, control valve 24 is completely open and control valve 25 is completely closed. In this manner, all of the exhaust gases from engine 12 will flow through exhaust intake conduit 16, through oxidation catalyst 26, filter 19, exhaust output conduit 21, and exit tail pipe 23. When a mixture of exhaust gases and fuel are rich of stoichiometry, the majority of the CO and HC in the exhaust gases are oxidized in oxidation catalyst 26, and the remaining CO and HC is oxidized over the platinum contained within the $NO_x$ trap-particulate filter 19.

When the quantity of absorbed $NO_x$ in filter 19 approaches the absorption capacity of the $NO_x$ trap wash coat 54 of filter 19, the $NO_x$ regeneration routine for this filter is initiated. At such time, control valve 25 is actuated to a fully opened position, and control valve 24 is set to a partially opened position to restrict the flow of exhaust gases through intake conduit 16. Diesel fuel from the supply 28 is injected by nozzle or valve 29 into intake conduit 16 and is carried toward filter 19 by the restricted exhaust flow in conduit 16. Fuel is injected such that the fuel quantity exceeds the stoichiometric amount required to completely react and consume all of the oxygen contained within the exhaust gases flowing through conduit 16. In other words, the mixture of exhaust gases and fuel is rich of stoichiometry. Catalytic combustion of the injected fuel occurs in oxidation catalyst 26. Excess fuel is carried downstream into filter 19 and reacts with the absorbed $NO_x$, thereby regenerating $NO_x$ trap wash coat 54 within filter 19.

During the $NO_x$ trap wash coat regeneration process, a substantial exothermic temperature rise occurs within oxidation catalyst 26 when catalyst 26 is oxidizing a rich mixture of exhaust gases and fuel. By locating the catalyst 26 upstream of $NO_x$ trap-particulate filter 19, relatively large temperature spikes caused by an exothermic energy release occur primarily in catalyst 26. Thus, a temperature of exhaust gases exiting catalyst 26 are maintained at a relatively uniform desired temperature which prevents thermal damage to filter 19. Because filter 19 is proximate catalyst 26, the temperature of filter 19 corresponds to the temperature of exhaust gases exiting catalyst 26.

Further, locating catalyst 26 adjacent and upstream of filter 19 allow for high molecular weight hydrocarbons within the diesel fuel to be cracked and partially oxidized by catalyst 26 (producing shorter chained hydrocarbons and $CO/H_2$) before entering filter 19. The shorter chained hydrocarbons vaporize at lower temperatures than non-oxidized hydrocarbons allowing for more effective $NO_x$ regeneration of filter 19.

When regeneration of $NO_x$ trap wash coat of filter 19 is complete, the diesel fuel injection is discontinued, and the control valve 24 is closed. At such time, all of the exhaust gases created by engine 12 will be flowing through exhaust intake conduit 18, oxidation catalyst 27, filter 20, output conduit 22, and tail pipe 23. When the $NO_x$ trap wash coat 54 of filter 20 becomes saturated, the above process is repeated for filter 20.

At the same time the level of absorbed $NO_x$ is being monitored in filters 19, 20, the amount of accumulated particulate matter and accumulated SOX (within $N_x$ trap wash coat 54) is monitored as well. The removal of particulate matter and desulfation processes can be accomplished in a single step. For example, when the accumulation of particulate matter and the buildup of $SO_x$ within the $NO_x$ trap wash coat of filter 19 exceeds a predetermined level, control valve 25 is fully opened and the control valve 24 is set to a partially opened position. Diesel fuel from the supply 28 is introduced through the nozzle or valve 29 into intake conduit 16 and carried towards filter 19 by the restricted exhaust flow. The rate of diesel fuel injection is set to obtain a rich air-fuel ratio needed to remove the absorbed $SO_x$. The time interval for the fuel injection and the time interval between subsequent injections are determined to provide the exothermic temperature rise required to desorb $SO_x$ from the $NO_x$ trap and to initiate oxidation of the particulate matter or soot in filter 19. The temperature sensor 31 provides a feedback control signal to ECM 34 to provide the fuel metering and timing control. Once the temperature of the filter 19 is maintained above a threshold temperature for removing $SO_x$ and particulate matter, fuel is delivered at periodic intervals to the exhaust gases. Thus, the exhaust gases are alternated between rich of stoichiometry and lean of stoichiometry. During delivery of rich exhaust gases, the $SO_x$ is removed from filter 19. During delivery of lean exhaust gases, particulate matter is removed from filter 19.

Figure 3A:
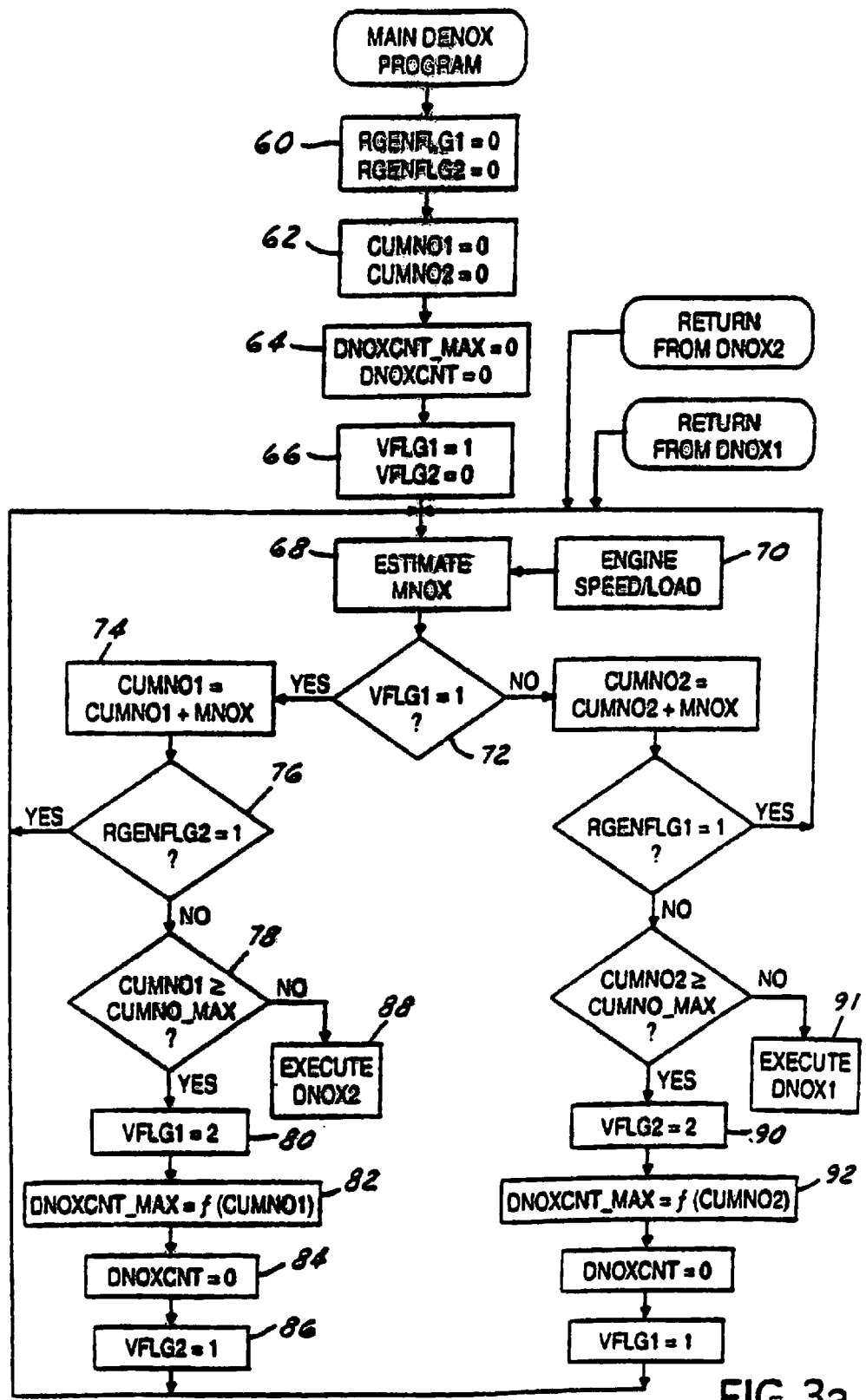
FIGS. 3A, 3B are flowcharts of a method for monitoring and removing stored NOx from the exhaust system of FIG. 1.
Figure 3B:
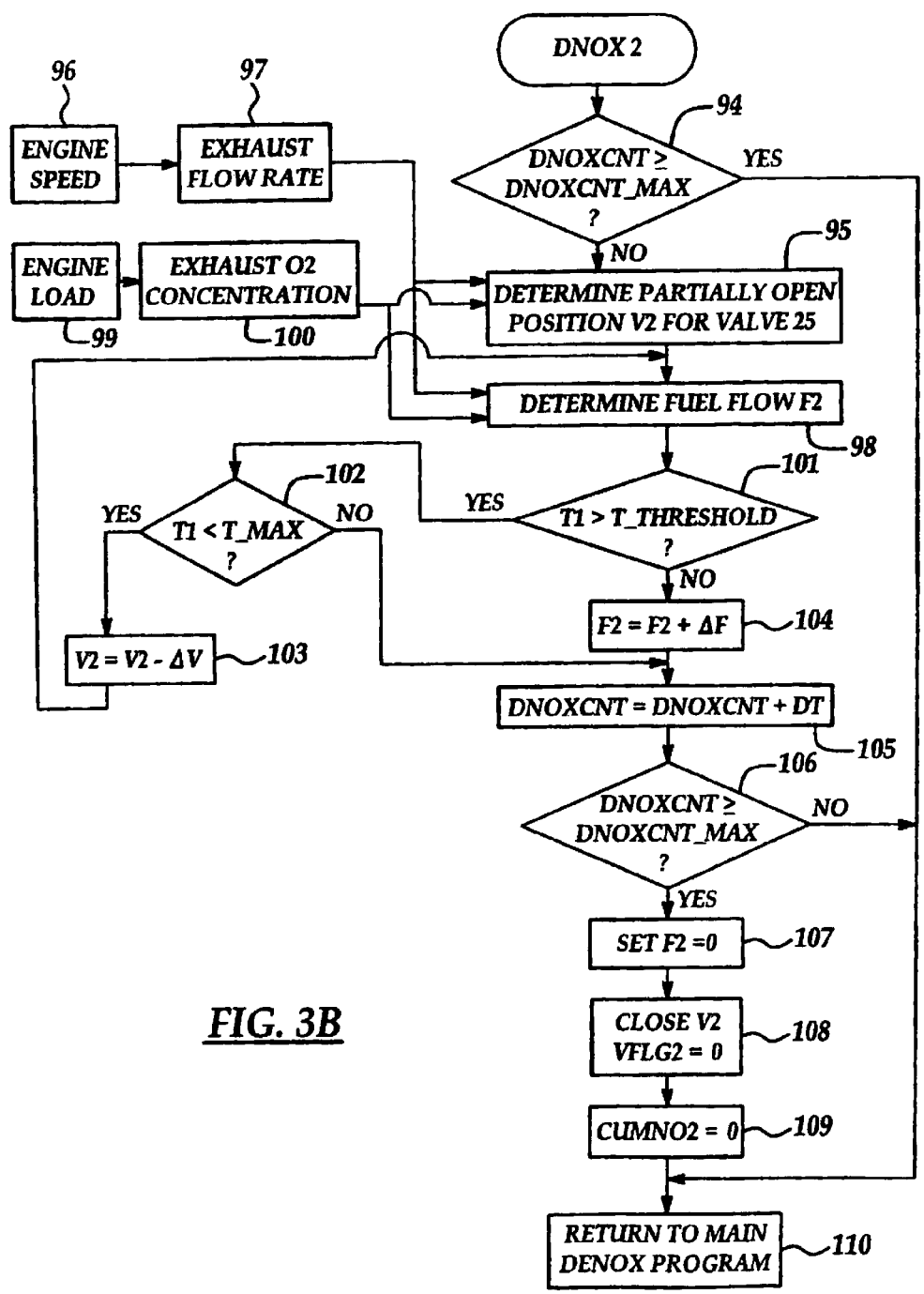

Referring to FIGS. 3A, 3B, 4A–4C, the method executed by ECM 34 to control the exhaust gas purification system 10 will now be described. FIGS. 3A and 3B describe a preferred control arrangement for monitoring $NO_x$ absorption in filters 19, 20 and regeneration of the same. As shown in FIG. 3A, the primary $NO_x$ control scheme begins with a series of initializations. In these logic control diagrams, the parallel filter arrangement as shown in FIG. 1 is considered to have two sides or paths. Thus, logic variables ending in the numeral "1" refer to the exhaust path containing filter 19 and logic variables ending in the numeral "2" refer to the exhaust path containing filter 20.

At step 60, the regeneration flags REGNFLG1 and RGENFLG2 for filters 19, 20, respectively are initialized to zero—indicating that particulate matter (PM) removal and desulfation ($SO_x$ regeneration) is not taking place.

At step 62, the values CUMNO1 and CUMNO2 corresponding to the cumulative $NO_x$ stored in filters 19, 20, respectively, are initialized to zero.

At step 64, the NOx regeneration counter DNOXCNT and the maximum value of the NOx regeneration counter are initialized to zero.

At step 66, the status of control valves 24, 25 are initialized. In this example, the control valve 24 is fully opened (VFLG1=1) and valve 25 is completely closed (VFLG2=0). The flags VFLG1 and VFLG2 indicate a partially open position when equal to the value of two. After initializing the foregoing variables, all of the exhaust gases will be flowing through filter 19.

At block 68, the mass of feed gas $NO_x$ (MNOX) generated by engine 12 is estimated as a function of the engine speed and load 70. The value MNOX can be readily determined from lookup tables indexed by engine speed and load created during engine mapping.

Because VFLG1 is initially equal to "1", the method advances from step 72 to step 74. At step 74, the value MNOX is added to the cumulative $NO_x$ (CUMNO1) absorbed by filter 19 through which the exhaust gases are flowing.

At step 76, the value RGENFLG2 indicating whether particulate matter and $SO_x$ regeneration is occurring for filter 20 is checked. If regeneration and particulate matter burn-off is not occurring in filter 20, then the method advances to step 78. Otherwise, the method returns to step 68.

At step 78, a determination is made as to whether the total mass of absorbed $NO_x$ (CUMNO1) is greater than or equal to a predetermined maximum value (CUMNO_MAX) for filter 19. If the value of step 78 equals "No", the $NO_x$ regeneration program (DNOX2) for the filter 20 is executed. Otherwise, the steps 80, 82, 84, 86 are performed.

At step 80, control valve 24 is partially closed. At step 82, the duration of the $NO_x$ regeneration (DNOXCNT_MAX) for filter 19 is set as a function of the total $NO_x$ absorbed. Next at step 84, the regeneration timer DNOXCNT is reset. Finally, at step 86, control valve 25 is fully opened.

Referring to FIG. 3B, the DNOX2 routine for removing NOx from filter 20 will now be described. Before entering the DNOX2 routine, control valve 24 will be fully open and control valve 25 will be partially open.

At step 94, a determination is made as to whether the regeneration counter DNOXCNT is greater than or equal to the count DNOXCNT_MAX. The value of the maximum count DNOXCNT_MAX corresponds to the amount of time required to remove the stored $NO_x$ in filter 20 (FIG. 3A, step 92). If the value of step 94 equals "Yes", the method if exited at step 110. Otherwise, the method advances to step 95. At step 95, a partially open position of valve 25 is determined. As shown, the position of valve 25 is determined from exhaust flow rate 97 and exhaust oxygen concentration 100. The exhaust flow rate 97 is determined as a function of engine speed 96. The exhaust oxygen concentration 100 is determined as a function of engine load 99. After step 95, the method advances to step 98.

At step 98, the amount of fuel flow F2 that is injected by injector 30 is determined. The fuel flow amount is calculated based on the exhaust flow rate 97 and the exhaust oxygen concentration 100.

At step 101, a determination is made as to whether the temperature T1 of oxidation catalyst 32 is greater than a threshold temperature T_THRESHOLD for optimal removal of NOx. The temperature T_THRESHOLD may be 270° C. for example. If the value of step 101 equals "Yes", the method advances to step 102 which determines whether the temperature is greater than a maximum temperature T_MAX. The value of T_MAX may be 400° C. for example. If the value of step 102 equals "Yes", the opened position V2 of valve 25 is reduced using the following equation:

$$V2=V2-\Delta V$$

where $\Delta V$ is a predetermined adjustment amount of valve 25 that is empirically determined. After step 103, the method returns to step 98 to recalculate the fuel flow F2 based on the new position of valve 25.

Referring again to step 101, if the temperature T1 is less than threshold temperature T_THRESHOLD for optimal removal of NOx, the method advances to step 104.

At step 104, the fuel flow F2 is increased based on the following equation:

$$F2=F2+\Delta F$$

where $\Delta F$ is a predetermined fueling adjustment amount for valve 30 that is empirically determined. The step 104 increases the amount of fuel combusted in oxidation catalyst 27 to thereby increase the temperature of catalyst 27 and filter 20.

Next at step 105, the counter DNOXCNT is incremented using the following equation:

$$DNOXCNT=DNOXCNT+DT$$

where DT corresponds to the time interval that has elapsed since the value DNOXCNT was previously incremented in this execution of the DNOX2 routine.

Next at step 106, a determination is made as to whether DNOXCNT is greater than or equal to maximum count DNOXCNT_MAX. If the value of step 106 equals "No", the method is exited at step 110. Otherwise, the method advances to step 107.

At step 107, the fuel flow F2 is set equal to zero thereby stopping the fuel flow from valve 30.

Next at step 108, the throttle valve 25 is closed and the flag VFLG2 is set equal to zero.

Next at step 109, the cumulative stored NOx value CUMNO2 is set equal to zero. Thereafter, the method is exited at step 110.

Although not shown, the DNOX1 regeneration routine for filter 19 is performed in a similar manner as described in routine DNOX2, except that valves 24, 29 are controlled instead of valves 25, 30, respectively. The DNOX1 regeneration routine for filter 19 is called from step 91 of FIG. 3A.

Figure 4A:
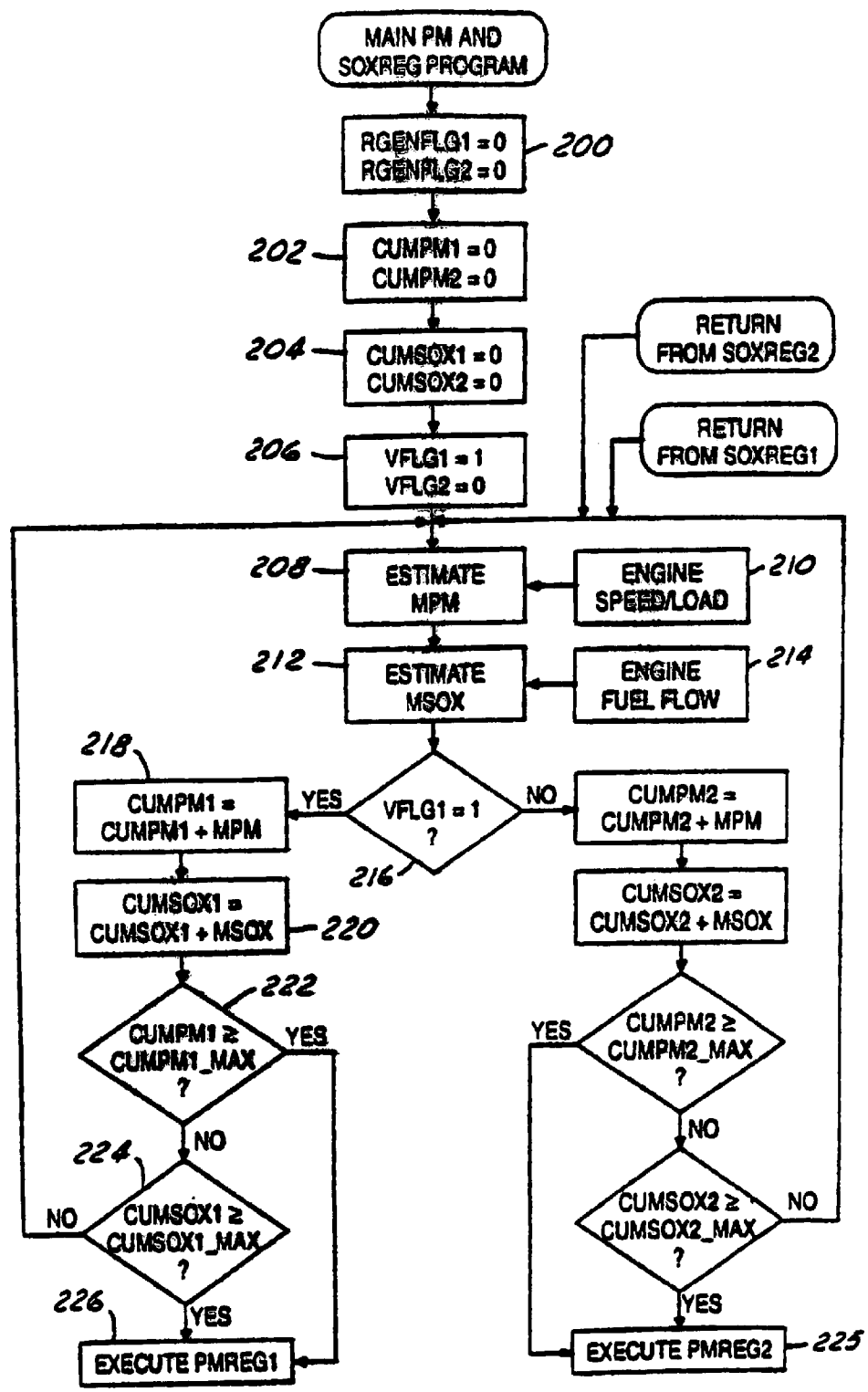
FIGS. 4A, 4B, 4C are flowcharts for monitoring and removing particulate matter and sulfur oxides ($SO_x$) stored in the exhaust filters of FIG. 1.
Figure 4B:
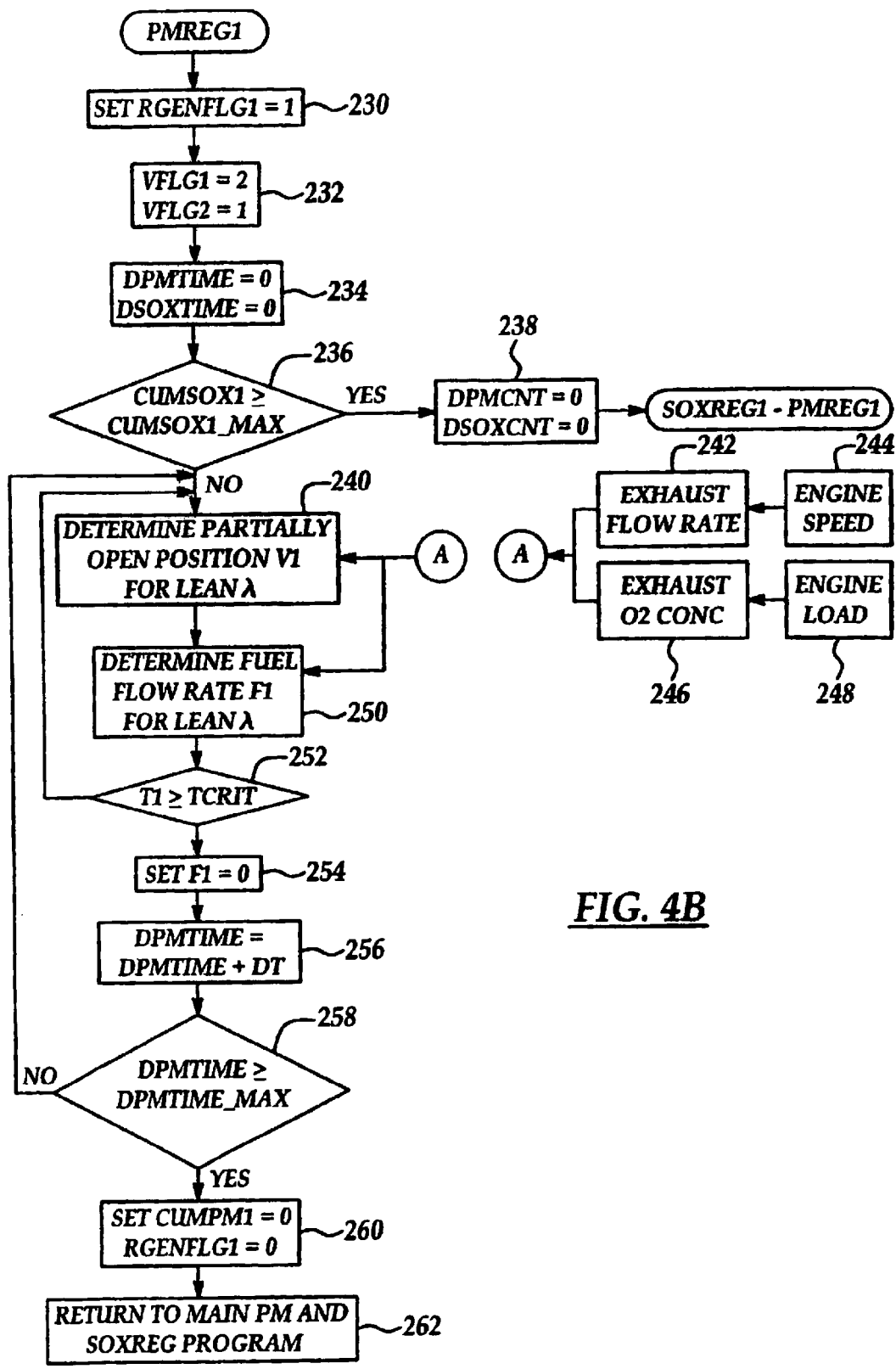
Figure 4C:
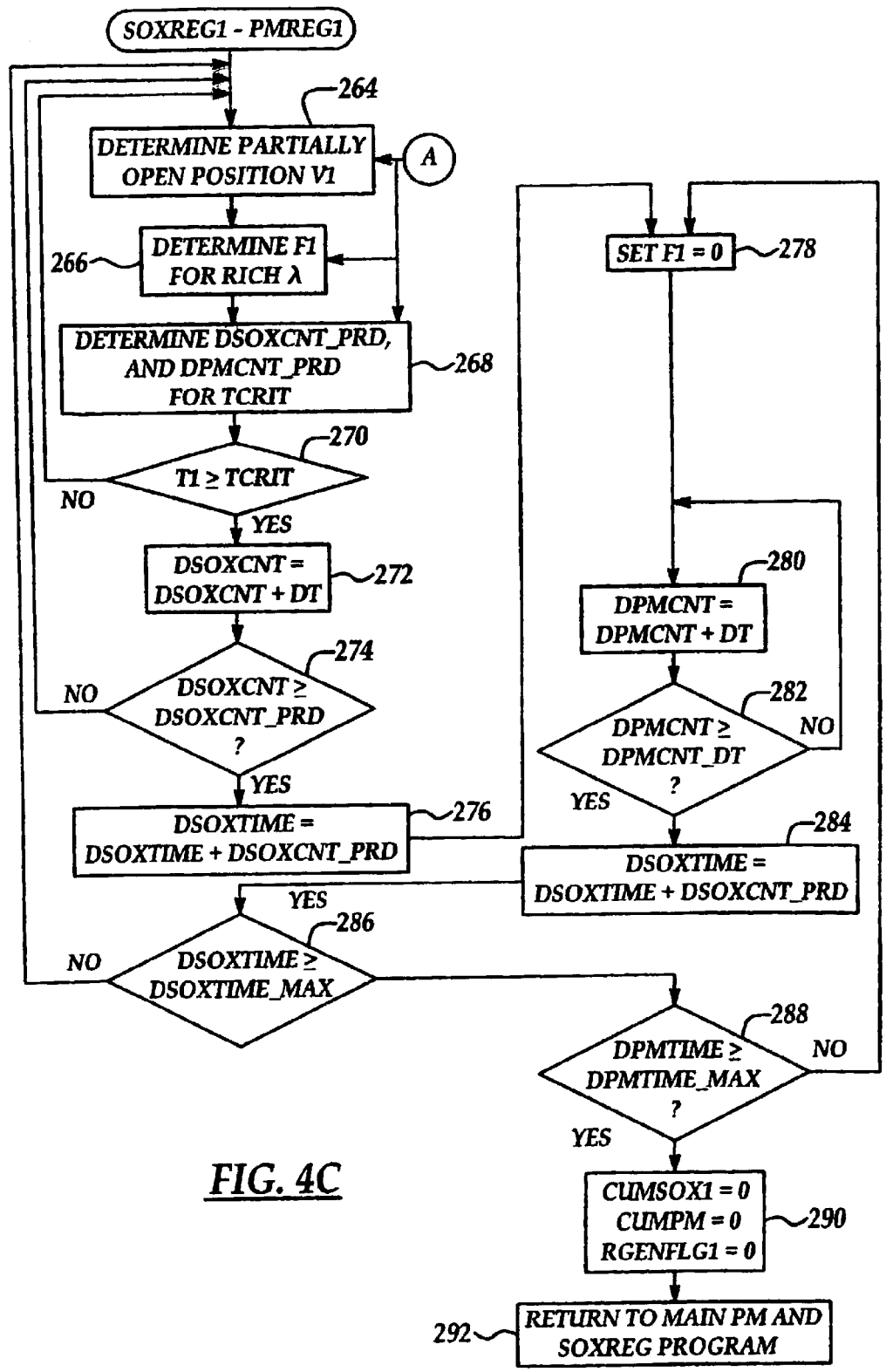

Referring to FIGS. 4A, 4B, 4C, the routines for removing particulate matter and SOX from filter 19 will now be described. The variables ending in the numeral "1" refer to the exhaust path communicating with filter 19 and variables ending in the numeral "2" refer to the exhaust path communicating with filter 20.

Referring to FIG. 4A, the Main Particulate Matter and SOXREG Routine is illustrated. At step 200, the regeneration flags are REGNFLG1 and REGNFLG2 are initialized to zero.

At step 202, the accumulated particulate matter counts CUMPM1 and CUMPM2 for filters 19, 20, respectively are initialized to zero.

At step 204, the accumulated sulfur counts CUMSOX1 and CUMSOX2 for filters 19, 20, respectively, are initialized to zero. At step 206, the first valve 24 is opened (VFLG1=1) and the second valve 25 is closed (VFLG2=0).

At step 208, the mass of particulate matter flowing through the first path is determined as a function of the engine speed/load 210.

Next at step 212, the mass of sulfur flowing through filter 19 is estimated as a function of the engine fuel flow 214. Since all of the exhaust is flowing through the first path 16, these estimated values will be attributed to filter 19 at steps 218 and 220. If either the accumulated total particulate matter in filter 19 as governed by decision step 222, or the total sulfur absorbed by filter 19 as dictated by decision step 224 exceeds a predetermined maximum, the PMREG1 routine is executed to regenerate filter 19.

Figure 5A:
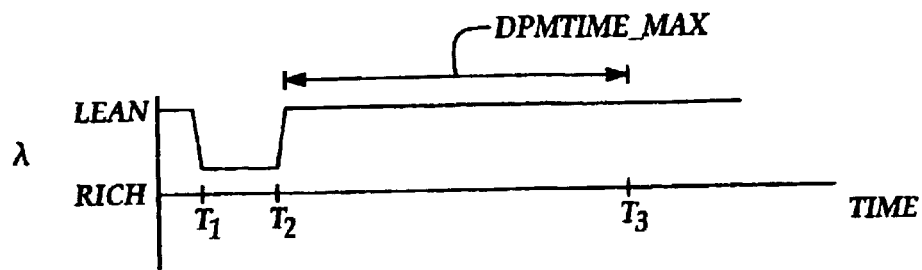
FIGS. 5A and 5B are schematics of signals illustrating the operation of the flowchart of FIG. 4B for removing particulate matter from an exhaust filter.
Figure 5B:
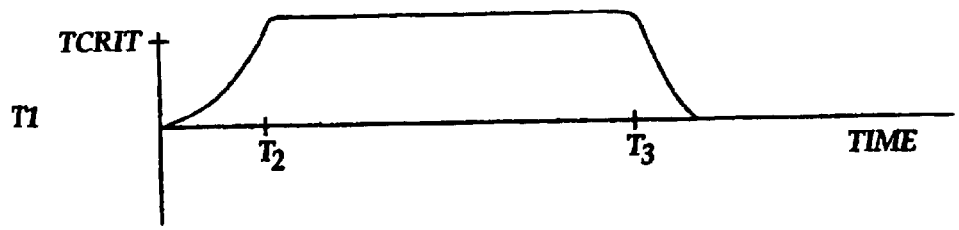

Before proceeding with a detailed discussion of the PMREG1 routine for removing particulate matter from filter 19, a general overview of the methodology will be explained. Referring to FIG. 5A, the lambda value ($\lambda$) corresponding to an exhaust gas-fuel ratio or an air-fuel ratio of exhaust gases flowing into oxidation catalyst 26 over time is illustrated. As shown, prior to time $T_1$, lambda ($\lambda$) is lean of stoichiometry. Between times $T_1$–$T_2$, lambda ($\lambda$) is reduced to a more rich value. Lambda ($\lambda$) may be made more rich by (i) throttling valve 24 to reduce the amount of exhaust gases flowing into catalyst 26 and (ii) injecting reductant, such as diesel fuel, via valve 29 into the exhaust gases flowing into catalyst 26. Referring to FIG. 5B, during the injection of fuel during time interval $T_1$–$T_2$ the fuel is completely combusted in catalyst 26 increasing the temperature of exhaust gases entering filter 19. At time $T_2$, the temperature T1 of catalyst 26 increases above a temperature TCRIT. The temperature TCRIT corresponds to a temperature above which particulate matter and $SO_x$ can be removed from filter 19. For example, TCRIT may be greater than or equal to 600° C. As illustrated, the lean mixture of exhaust gases burns off the particulate matter in filter 19 over the time period DPMTIME_MAX.

Referring to FIG. 4B, the PMREG1 routine for removing particulate matter from filter 19 is illustrated. The PMREG1 routine is called by step 226 of FIG. 4A.

At step 230, the regeneration flag RGENFLG1 is initialized to a value of one indicating regeneration has commenced.

Next at step 232, the first valve 24 is partially opened (VFLG1=2) and the second valve 25 is opened fully (VFLG2=1).

Next at step 234, the particulate matter burn-off time DPMTIME is initialized and the $SO_x$ regeneration time DSOXTIME is initialized. The value DPMTIME corresponds to an amount of time that particulate matter has been burned off of filter 19. The value DSOXTIME corresponds to an amount of time that SOx has been removed from filter 19.

Next at step 236, a determination is made as to whether the cumulative amount of stored $SO_x$ value CUMSOX1 is greater than or equal to the value CUMSOX1_MAX. If the value of step 236 equals "Yes", the method advances to step 238 that initializes the values DPMCNT and DSOXCNT. Thereafter, the routine SOXREG1-PMREG1 is executed to purge both $SO_x$ and particulate matter from filter 19. Alternately, if the value of step 236 equals "No", only particulate matter regeneration is required and the method advances to step 240.

Next at step 240, the partially open position V1 for valve 24 is determined as a function of the exhaust flow rate 242 and exhaust concentration 246. The exhaust flow rate 242 is determined from engine speed 244. The exhaust concentration 246 is determined based on engine load 248.

Next at step 250, the fuel flow rate Fl that is delivered by valve 29 into the exhaust gases upstream of oxidation catalyst 26 is determined based on exhaust flow rate 242 and exhaust oxygen concentration 246. The injected fuel results in catalytic combustion over oxidation catalyst 26 in the first exhaust path and a corresponding exothermic reaction. The reaction is allowed to continue until the temperature reaches a threshold temperature TCRIT where sustained oxidation of particulate matter on in filter 19 is achieved. The mixture of exhaust gases and fuel entering oxidation catalyst 26 may be lean of stoichiometry. Alternately, when a faster temperature increase is desired in oxidation catalyst, the mixture may initially be rich of stoichiometry until a temperature above TCRIT is achieved.

At step 252, a determination is made as to whether temperature T1 downstream of oxidation catalyst 26 is greater than temperature TCRIT. If the value of step 252 equals "No", the method re-executes steps 240 and 250 to increase the temperature T1. Otherwise, the method advances to step 254.

At step 254, fuel flow through valve 29 is shut off. In other words, no further reductant is provided to oxidation catalyst 26 once sustained oxidation of the soot has been achieved in filter 19.

Next at step 256, the counter DPMTIME is incremented utilizing the following equation:

$$DPMTIME=DPMTIME+DT$$

where DT corresponds to the amount of elapsed time since the value DPMTIME was last incremented during this execution of the PMREG1 routine.

Next at step 258, a determination is made as to whether the value DPMTIME is greater than or equal to a maximum allowable time DPMTIME_MAX for removing the particulate matter. If the value of step 258 equals "No", the method advances back to step 240 for continued oxidation of particulate matter in filter 19. Otherwise, the method advances to step 260 which sets the total particulate matter value CUMPM1 equal to zero. Further, the flag RGENFLG1 is set equal to zero. Thereafter at step 262, the routine is exited and the method returns to the MAIN PM and SOXREG program.

Figure 6A:
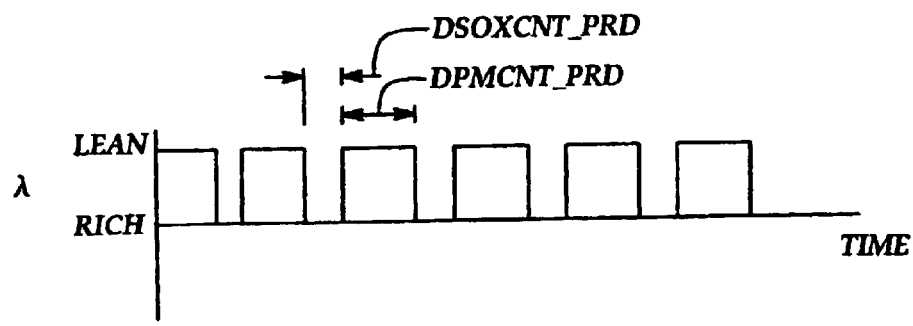
FIGS. 6A and 6B are schematics of signals illustrating the operation of the flowchart of FIG. 4C for removing particulate matter and $SO_x$ from an exhaust filter.

Before proceeding with a detailed discussion of the SOXREG1-PMREG1 routine for removing particulate matter and SOX from filter 19, a general overview of the methodology will be explained. Referring to FIG. 6A, the lambda value ($\lambda$) corresponding to an exhaust gas-fuel ratio of exhaust gases flowing into oxidation catalyst 26 over time is illustrated. As shown, lambda ($\lambda$) is alternated between being lean of stoichiometry and rich of stoichiometry. Particulate matter is removed from filter 19 when lambda (λ) is lean of stoichiometry. $SO_x$ is removed from filter 19 when lambda (λ) is rich of stoichiometry.

Figure 6B:

During each time period DSOXCNT_PRD lambda (λ) is maintained rich of stoichiometry. A portion of the rich mixture is combusted on oxidation catalyst 26 to increase the temperature of the catalyst 26. Further, as illustrated in FIG. 6B, the temperature T1 of catalyst 26 is maintained above the temperature TCRIT. A remaining non-combusted portion of the rich mixture removes $SO_x$ stored in filter 19. During each time period DPMCNT_PRD, lambda (λ) is maintained lean of stoichiometry. The lean mixture (containing excess oxygen by definition) burns off particulate matter stored in filter 19.

Referring to FIG. 4C, the routine SOXREG1-PMREG1 for removing $SO_x$ and particulate matter from filter 19 is illustrated.

At step 264, the partially open position V1 for valve 24 is determined as a function of the exhaust flow rate 242 and exhaust oxygen concentration 246.

Next at step 266, the fuel flow rate F1 delivered into the exhaust gases upstream of catalyst 26 is determined based on exhaust flow rate 242 and exhaust oxygen concentration 246.

Next at step 268, the intermediate period (DSOXCNT_PRD) for removing $SO_x$, and the intermediate period (DPMCNT_PRD) for removing particulate matter is determined. It should be noted that the sum of the DSOXCNT_PRD values corresponds to the De-SOx regeneration period DSOX_TIME_MAX. Similarly, the sum of the DPMCNT_PRD values correspond to the total particulate matter regeneration period DPMTIME_MAX. The values DSOXCNT_PRD and DPMCNT_PRD may be obtained from a table stored in memory 38 indexed by exhaust flow rate 242, exhaust oxygen concentration 246, and fueling rate F1.

As shown in FIG. 6A, the periods DSOXCNT_PRD and DPMCNT_PRD are utilized to create fuel injection pulses to obtain the fuel flow rate F1 (and a desired lambda value). The fuel injection pulses create a mixture of exhaust gases and fuel that alternate between being rich of stoichiometry and lean of stoichiometry. When the mixture is rich of stoichiometry, a portion of the fuel is burned in oxidation catalyst 26 increasing the temperature of filter 19. The remaining un-combusted fuel decomposes stored SOx within the $NO_x$ trap wash coat of filter 19.

Next at step 270, a determination is made as to whether temperature T1 of oxidation catalyst 26 is greater than temperature TCRIT. If the value of step 270 equals "No", the method re-executes steps 264 and 266 to increase the temperature T1. Otherwise, the method advances to step 272.

At step 272, the time DSOXCNT is incremented utilizing the following equation:

DSOXCNT=DSOXCNT+DT where DT corresponds to the elapsed time since the value DSOXCNT was last incremented in this execution of the SOXREG1-PMREG1 routine.

Next at step 274, a determination is made as to whether the value DSOXCNT is greater than or equal to the value DSOXCNT_PRD. If the value of step 274 equals "No", the method returns to step 264 for continued delivery of reductant to filter 19 to remove $SO_x$ from filter 19. Otherwise, the method advances to step 276.

At step 276, the value DSOXTIME is incremented using the following equation:

DSOXTIME=DSOXTIME+DSOXCNT_PRD

Next at step 278, the fuel flow rate F1 is set equal to zero to create a lean mixture of exhaust gases for removing particulate matter from filter 19.

Next at step 280, the valve DPMCNT is incremented using the following equation:

DPMCNT=DPMCNT+DT where DT corresponds to the amount of elapsed time since the value DPMCNT was last incremented in this execution of the SOXREG1-PMREG1 routine.

At step 282, a determination is made as to whether DPMCNT is greater than or equal to regeneration period DPMCNT_PRD. If the value of step 282 equals "Yes", the method returns to step 280 for continued removal of particulate matter from filter 19. Otherwise, the method advances to step 284.

At step 284, the total measured regeneration time DPMTIME is incremented using the following equation:

DPMTIME=DPMTIME+DPMCNT_PRD

Next at step 286, a determination is made as to whether the measured $SO_x$ regeneration time DSOXTIME is greater than or equal to the value DSOXTIME_MAX. If the value of step 286 equals "Yes", the method advances to step 288 explained below. Otherwise, the method returns to step 264 described above.

At step 288, a determination is made as to whether the measured particulate matter removal time DPMTIME is greater than or equal to value DPMTIME_MAX. If the value of step 288 equals "No", the method returns to steps 278 for continued removal of particulate matter from filter 19. Otherwise, the method advances to step 290.

At step 290, the values CUMSOX1, CUMPM, REGN-FLG1 are all set to zero. Thereafter, the routine is exited at step 292.

The inventive system and method provides a substantial advantage over known systems and methods. In particular, the inventive system and method vaporizes a reductant prior to supplying the reductant to an emission control device to increase NOx reduction by the device as compared with known systems.

We claim:

1. A method for removing NOx from an emission control device receiving exhaust gases from an engine, the emission control device being coupled adjacent and downstream of an oxidation catalyst, the method comprising:

adding a reductant to said exhaust gases flowing into said oxidation catalyst, wherein an amount of reductant to add to said exhaust gases is determined based on an amount of exhaust gases flowing into said oxidation catalyst;

partially oxidizing said reductant in said oxidation catalyst to transition a remaining portion of said reductant into a vapor phase; and, oxidizing said remaining portion of said reductant in said emission control device to remove NOx from said device.

2. The method of claim 1 wherein said step of adding said reductant produces a mixture of said exhaust gases and said reductant that is rich of stoichiometry.

3. The method of claim 1 wherein said amount of reductant to add to said exhaust gases is further adjusted based on a temperature of said oxidation catalyst.

4. The method of claim 1 wherein said amount of reductant to add to said exhaust gases is further adjusted to maintain a temperature of said device within a predetermined temperature range.

5. The method of claim 1 wherein said reductant comprises hydrocarbons.

6. The method of claim 5 wherein said step of partially oxidizing said added hydrocarbons produces hydrocarbons having a lower molecular weight hydrocarbons flowing into said emission control device.

7. The method of claim 1 wherein said step of partially oxidizing said reductant increases a temperature of said device.

8. The method of claim 7 wherein a temperature of said oxidation catalyst is indicative of said temperature of said downstream device.

9. A method for removing NOx from an emission control device receiving exhaust gases from an engine, the emission control device being coupled adjacent and downstream of an oxidation catalyst, the method comprising:

adding hydrocarbons to said exhaust gases flowing into said oxidation catalyst, wherein an amount of reductant to add to said exhaust gases is determined based on an amount of exhaust gases flowing into said oxidation catalyst; partially oxidizing said hydrocarbons in said oxidation catalyst to cause a remaining portion of said hydrocarbons to transition to a vapor phase; and, oxidizing said remaining portion of said hydrocarbons in said emission control device to remove NOx from said device.

10. A system for removing NOx from an emission control device receiving exhaust gases from an engine, the system comprising:

an oxidation catalyst receiving exhaust gases from said engine, said oxidation catalyst coupled adjacent and upstream of said emission control device;

a valve selectively supplying reductant to said exhaust gases flowing into said oxidation catalyst responsive to a first signal; and, a controller operably connected to said valve, said controller generating said first signal to add said reductant to said exhaust gases flowing into said oxidation catalyst, wherein said controller is further configured to determine an amount of reductant to add to said exhaust gases based on an amount of exhaust gases flowing into said oxidation catalyst, said oxidizing catalyst partially oxidizing said reductant to obtain a remaining portion of said reductant in a vapor phase, said device oxidizing said remaining portion of said reductant to remove NOx from said device.

11. The system of claim 10 wherein a mixture of said exhaust gases and said reductant flowing into said oxidation catalyst is rich of stoichiometry.

12. The system of claim 10 wherein said controller is further configured to further adjust said amount of reductant to add to said exhaust gases based on a temperature of said oxidation catalyst.

13. The system of claim 10 wherein said controller is further configured to further adjust said amount of reductant to maintain said temperature of said oxidation catalyst within a predetermined temperature range.

14. The system of claim 10 wherein said reductant comprises hydrocarbons.

15. The system of claim 14 wherein partially oxidizing said added hydrocarbons produces hydrocarbons having a lower molecular weight than said added hydrocarbons, said hydrocarbons with said lower molecular weight flowing into said emission control device.

16. The system of claim 10 wherein said emission control device comprises one of a NOx absorber, a catalytic converter, and a combined particulate filter and NOx trap.

* * * * *